No. 884,931. PATENTED APR. 14, 1908.
D. A. KEOGAN.
MOLD FOR MAKING CEMENTITIOUS ARTICLES.
APPLICATION FILED NOV. 18, 1907.
2 SHEETS—SHEET 1.
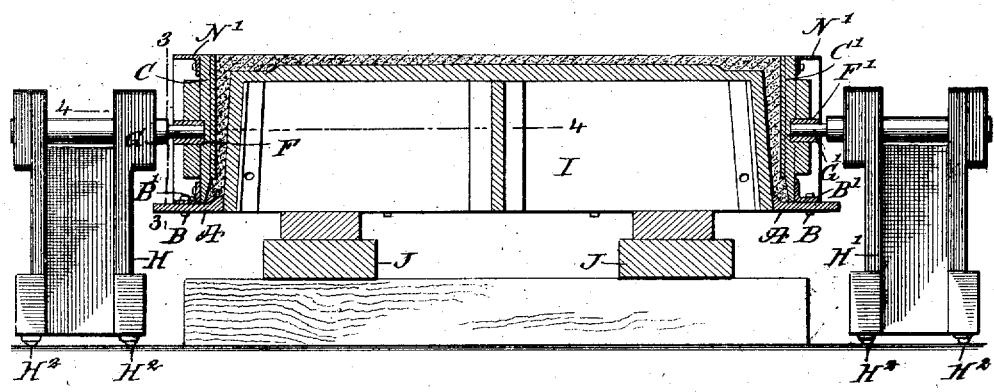
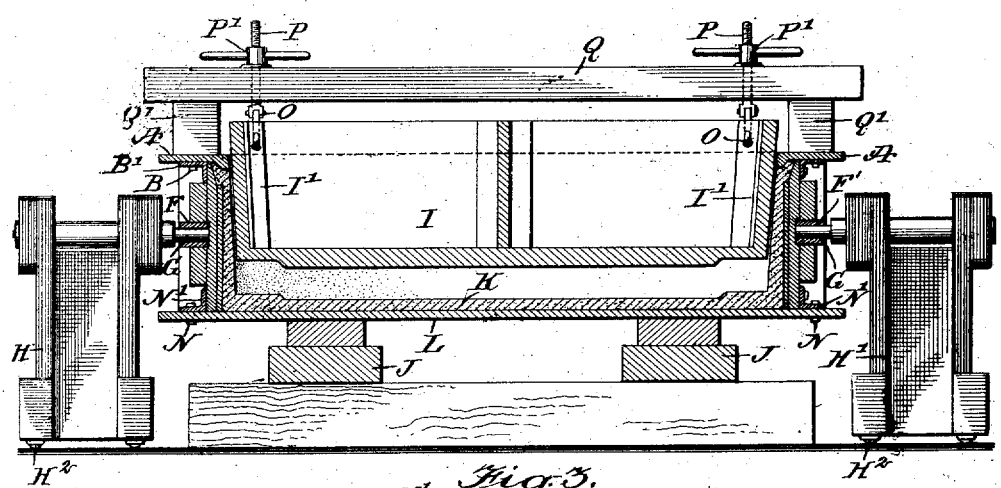
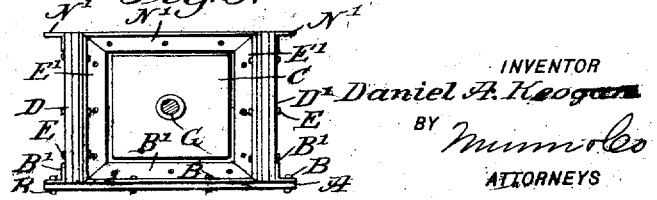
WITNESSES
INVENTOR
Daniel A. Keogan
BY Munn & Co
ATTORNEYS

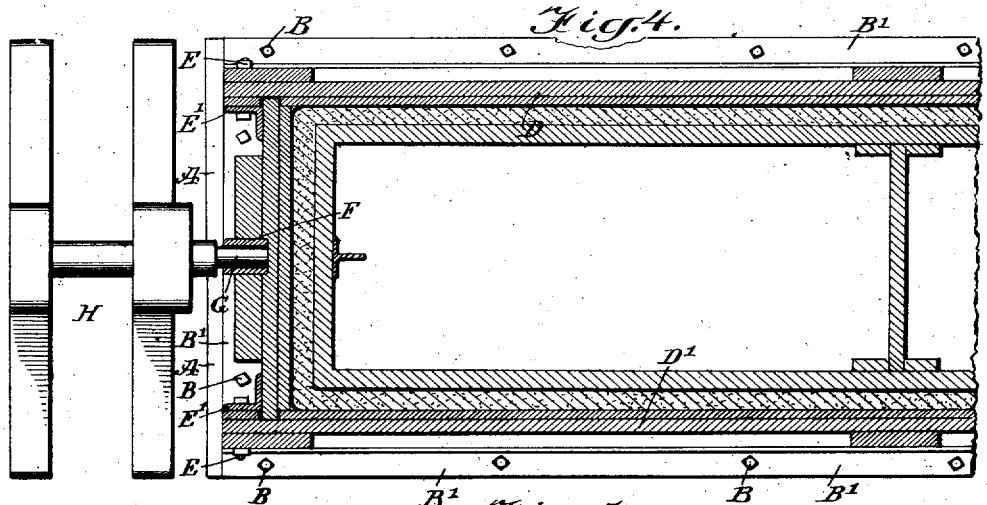
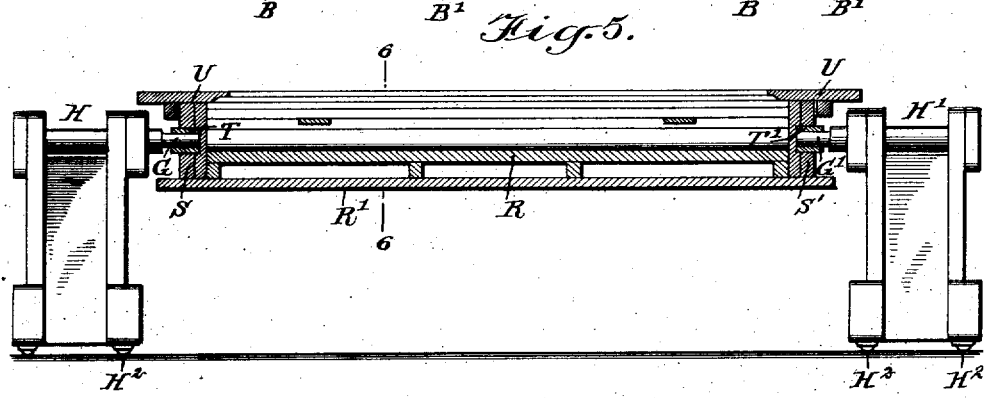
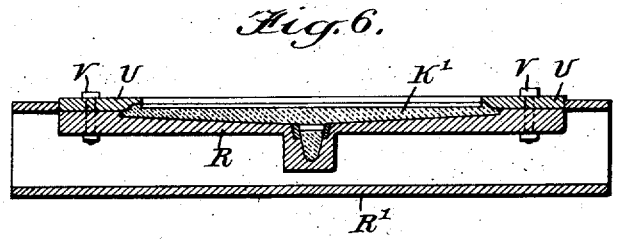

UNITED STATES PATENT OFFICE.

DANIEL A. KEOGAN, OF WHITE HAVEN, PENNSYLVANIA.

MOLD FOR MAKING CEMENTITIOUS ARTICLES.

No. 884,931.  Specification of Letters Patent.  Patented April 14, 1908.

Application filed November 18, 1907. Serial No. 402,616.

*To all whom it may concern:*

Be it known that I, DANIEL A. KEOGAN, a citizen of the United States, and a resident of White Haven, in the county of Luzerne and State of Pennsylvania, have invented a new and Improved Mold for Making Cementitious Articles, of which the following is a full, clear, and exact description.

The invention relates to molds for making cementitious burial vaults, such as shown and described in the application for Letters Patent of the United States, No. 402,417, filed under even date herewith.

The object of the invention is to provide a new and improved mold for making articles of cementitious material such as burial vaults and the like, and arranged to allow the operator to conveniently open and close the mold and to properly support the molded article while setting and hardening.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a longitudinal sectional elevation of the mold, arranged for making the receptacle of a burial vault; Fig. 2 is a like view of the same, showing the mold turned over for removal of the core and for supporting the molded burial vault; Fig. 3 is a cross section of the same on the line 3—3 of Fig. 1; Fig. 4 is an enlarged sectional plan view of part of the improvement on the line 4—4 of Fig. 1; Fig. 5 is a longitudinal sectional elevation of the mold for making the cover or lid, and Fig. 6 is a transverse section of the same on the line 6—6 of Fig. 5.

The sectional casing of the mold, shown in Figs. 1, 2, 3 and 4, consists of an annular bottom plate A, made rectangular, and to which are removably secured by bolts B and angle-irons B', the ends C, C' and the sides D, D' of the casing. The ends and the sides are removably fastened together by bolts E and angle-irons E', as plainly indicated in Fig. 4, to securely hold the said parts of the sectional casing in secure position during the time the cementitious plastic material is filled into the mold.

The ends C, C' of the sectional casing are provided with bearings F, F', for engagement by trunnions G, G' held on standards H, H', preferably mounted on casters $H^2$, to permit of conveniently moving the standards to or from the casing whenever it is desired to engage the trunnions G, G' with the bearings F, F' or to remove the said trunnions from the bearings. Now by the arrangement described, the trunnions G, G' when in engagement with the bearings F, F' support the sectional casing and allow of turning the same into an upside down position, as illustrated in Fig. 2.

The core I for the sectional casing extends into the latter through the opening of the bottom plate A, as plainly indicated in Fig. 1, the lower end of the core I fitting the inner wall of the bottom plate A, so as to close the casing at the bottom thereof. The core I is supported on blocks J or other supports, wholly independent of the standards H, H' and their trunnions G, G' used for supporting the sectional casing. Now when the sectional casing and the core I are in the position indicated in Fig. 1, then the plastic cementitious material can be placed into the sectional casing and tamped therein, to form the receptacle K, as indicated in Fig. 2, and when this has been done a top plate L is fastened by bolts N and angle-irons N' to the upper portions of the ends C, C' and the sides D, D' of the sectional casing, and when this has been done the mold is turned into an upside down position, as shown in Fig. 2, the top plate L then being the bottom plate resting on the supports J. The core I can now be conveniently withdrawn from the mold, and for this purpose the core I is provided at the inside with apertured ribs I', engaged by hooks O, held on the lower ends of screw rods P, on which screw handled nuts P', screwing against a beam Q, supported from the bottom plate A by short blocks Q'. After the core I is removed, the operator can shift the standards H and H' to one side, thus disengaging the trunnions G, G' from the bearings F, F', after which the ends C, C' and the sides D, D' can be disconnected from the bottom plate A and the top plate L, to allow of using the parts of the mold over again for forming another cementitious article.

The mold shown in Figs. 5 and 6 is used for molding the cover or lid K' for closing the receptacle K, and this cover mold consists essentially of a sectional casing having a recessed bottom R, supported on a bottom plate R', and the ends S, S' having bearings T, T' adapted to be engaged by the trunnions G, G' of the movable standards H, H' previously described. An annular top plate U, is removably fastened by bolts V, to the sides of the bottom R and to the ends S, S', it being understood that the sides of the casing are formed by the bottom R, as plainly indicated in Fig. 6. The bottom R is recessed on its upper face according to the shape to be given to the cover or lid K', as will be readily understood by reference to Fig. 6.

After the cover is formed in the mold and the plastic material has set and hardened, then the mold is turned upside down and the top plate U is supported on the supports J, after which the several parts of the mold are disconnected and removed to allow the cover to rest until completely dry.

Having thus described my invention I claim as new and desire to secure by Letters Patent:

1. A mold for making cementitious articles, comprising a sectional casing, a core extending into the casing and closing the same at the bottom thereof, means for supporting the casing and on which the latter is mounted to turn, and means for supporting the said core independently of the said supporting means for the casing.

2. A mold for making cementitious articles, comprising a sectional casing, a core extending into the casing and closing the same at the bottom thereof, and movable trunnions for supporting the said casing and allowing the latter to be inverted.

3. A mold for making cementitious articles, comprising a sectional casing, a core extending into the casing and closing the same at the bottom thereof, movable trunnions for supporting the said casing and allowing the latter to be inverted, and a support for the said core independent of the said trunnions.

4. A mold for making cementitious articles, comprising a sectional casing, a core extending into the casing and closing the same at the bottom thereof, bearings on the ends of the said casing, and movable standards having trunnions for engagement with the said bearings.

5. A mold for making cementitious articles, comprising a casing, and standards movable toward and from the casing and provided with means for engaging and supporting the casing and allowing the latter to be inverted.

6. A mold for making cementitious articles, comprising a casing having bearings, and movable standards having trunnions for engaging the said bearings.

7. A mold for making cementitious articles comprising a sectional casing having a rectangular bottom plate, ends and sides secured to the said bottom plate, a core extending into the said casing through the said bottom plate and closing the latter, bearings on the said casing ends, and movable standards having trunnions for engagement with the said bearings to support the casing and allow the latter to be inverted.

8. A mold for making cementitious articles, comprising a sectional casing having a rectangular bottom plate, ends and sides secured to the said bottom plate, a core extending into the said casing through the said bottom plate and closing the latter, movable supporting means for the mold and on which the mold can be turned to invert the latter, a top plate for attachment to the top of the casing to support the casing and the article on turning the mold upside down, and means for supporting the top plate when the mold is inverted.

In testimony whereof I have signed my name to this specification in the presence of two subscribing witnesses.

DANIEL A. KEOGAN.

Witnesses:
CHAS. E. ADAMS,
I. A. DRIGGS.

---

Correction in Letters Patent No. 884,931.

It is hereby certified that in Letters Patent No. 884,931, granted April 14, 1908, upon the application of Daniel A. Keogan, of White Haven, Pennsylvania, for an improvement in "Molds for Making Cementitious Articles," an error appears in the printed specification requiring correction, as follows: In line 12, page 1, the serial number "402,417" should read *402,617;* and that the said Letters Patent should be read with this correction therein that the same may conform to the record of the case in the Patent Office.

Signed and sealed this 14th day of April, A. D., 1908.

[SEAL.]

C. C. BILLINGS,
*Acting Commissioner of Patents.*

It is hereby certified that in Letters Patent No. 884,931, granted April 14, 1908, upon the application of Daniel A. Keogan, of White Haven, Pennsylvania, for an improvement in "Molds for Making Cementitious Articles," an error appears in the printed specification requiring correction, as follows: In line 12, page 1, the serial number "402,417" should read *402,617;* and that the said Letters Patent should be read with this correction therein that the same may conform to the record of the case in the Patent Office.

Signed and sealed this 14th day of April, A. D., 1908.

[SEAL.]

C. C. BILLINGS,

*Acting Commissioner of Patents.*